United States Patent [19]

Wakino et al.

[11] Patent Number: 4,487,578
[45] Date of Patent: Dec. 11, 1984

[54] CONTINUOUS FIRING EQUIPMENT

[75] Inventors: Kikuo Wakino, Muko; Kiichi Minai, Shiga; Hiroshi Seno, Kyoto, all of Japan

[73] Assignee: Murata Manufacturing Co., Ltd., Japan

[21] Appl. No.: 435,231

[22] Filed: Oct. 19, 1982

[51] Int. Cl.³ .............................. F27B 9/26; F27B 9/06
[52] U.S. Cl. .................................... 432/137; 432/241; 432/243; 104/172 B
[58] Field of Search ............... 432/121, 141, 137, 153, 432/241, 243, 258, 192; 104/172 B, 172 C

[56] References Cited

U.S. PATENT DOCUMENTS

| | | | |
|---|---|---|---|
| 762,311 | 6/1904 | Hopkins | 104/172 C |
| 1,205,065 | 11/1916 | Weathers | 104/172 B |
| 2,930,600 | 3/1960 | Boden | 432/241 |
| 3,545,733 | 12/1970 | Anderson | 432/241 |
| 3,614,076 | 10/1971 | Schmidt | 432/241 |
| 3,627,286 | 12/1971 | Palmer, Jr. | 432/241 |
| 3,719,151 | 3/1973 | Anderson | 104/172 B |
| 3,774,545 | 11/1973 | Karlstrom | 104/172 C |
| 3,880,578 | 4/1975 | Chartet | 432/243 |
| 3,892,307 | 7/1975 | Scholl | 432/137 |

Primary Examiner—Henry C. Yuen
Attorney, Agent, or Firm—Ostrolenk, Faber, Gerb & Soffen

[57] ABSTRACT

A continuous firing equipment for ceramics is disclosed. A furnace body is equipped with electrical heating elements and has a horizontally looped track extending therethrough. A plurality of cars made of a metal material having a small heat capacity and a high resistance to thermal shocks are arranged all along the track so as to travel on the track. A plurality of saggars made of a ceramic wool material are loaded on the cars. A drive system including a looped driving member arranged along the circumference of the track and coupled to the cars is provided for driving the cars along the track.

8 Claims, 4 Drawing Figures

CONTINUOUS FIRING EQUIPMENT

BACKGROUND OF THE INVENTION

1. Field of the Invention

The present invention relates to a continuous firing equipment and, more particularly, it relates to a furnace for continuously firing ceramics and like products.

2. Description of the Prior art

In the manufacture of ceramics and like products, there have widely been used tunnel kilns having a cunstruction as shown in FIG. 1, wherein a sagger 2 in which ware to be fired have been placed is loaded on a ceramic tray 1, and it is then moved on a track 7 from the point of feed through a chamber 5 of a furnace 4 to the point of discharge by means of a pusher 3. The ceramic tray 1 used in such firing process must be strong enough to resist the pressure applied by the pusher 3, it is necessary to construct the tray so as to have a high mechanical strength. To that end, the ceramic tray 1 must be made thicker. Consequently, the heat capacity of the tray becomes considerably large and the amount of heat needed to heat the tray 1 becomes large as compared with the heat needed to heat the ware to be fired. This results in a considerable increase of the heat lost by the trays and in lowering of the temperature gradient in the furnace. This necessarily causes an increase in the length of the furnace and in the firing time. In addition, the trays have generally been made of a ceramic material such as alumina, zirconia, fire brick, insulating brick and the like that has a low resistance to thermal shocks, so that they impose restrictions on the heating rate and the cooling rate of the ware, thus making it impossible with such trays to fire the ware that requires the rapid heating and the rapid cooling. Since the trays are moved intermittently, it is not possible to achieve continuous firing of the ware to be fired. For the reasons mentioned above, it takes a long time to fire the ceramic ware. For example, the firing of the ceramic ware takes about 16 hours since the heating rate and the cooling rate have been restricted to about 200° C./hour at the maximum.

On the other hand, it has been desirable to develop new firing equipment for tunnel kilns, due to the significant increases in the cost of energy as well as a great demand for the reduction of the firing time.

SUMMARY OF THE INVENTION

It is therefore an object of the present invention to provide a continuous firing equipment that achieves high-speed firing.

Another object of the present invention is to provide a continuous firing equipment that achieves firing of the ware in continuous movement.

Still another object of the present invention is to provide a continuous firing equipment that reduces energy costs.

According to the present invention, there is provided a continuous firing equipment comprising:
- a furnace body equipped with electrical heating means;
- a horizontal looped track extending through the furnace body;
- a plurality of cars made of a metal material having a small heat capacity and a high resistance to thermal shocks are arranged all along the track so as to travel on the track;
- a plurality of saggars made of a ceramic wool material and loaded on said cars, said saggars being adapted to be loaded on and unloaded from said cars; and
- means for driving said cars, said driving means comprising a looped driving member arranged along a circumference of said track and coupled to said cars.

In a preferred embodiment of the present invention, the looped track with a flat surface is so designed that it has parallel linear portions, one of which is extended through the furnace body. Also, adjacent to the other linear portion or a curved portion of the track that are out of the furnace body, there are arranged stations for loading the ware to be fired on the cars and for unloading the fired ware from the cars.

In another preferred embodiment, saggars made of a ceramic wool material are employed to achieve high-speed firing of the ware.

In the continuous firing equipment according to the present invention, the cars on which the ware to be fired are loaded are pulled and moved continuously over the looped track by the driving member without no mechanical shock, thus making it possible to use cars with a small heat capacity. The use of such cars enables to achieve high-speed firing and cut of the energy consumption since the heat carried out of the furnace by the cars can be considerably decreased.

BRIEF DESCRIPTION OF THE DRAWINGS

These and other objects, features and advantages of the present invention will be further apparent from the following description with reference to the accompanying drawings which show, by way of example only, one preferred embodiment of the present invention.

DETAILED DESCRIPTION OF THE INVENTION

Figure 1:
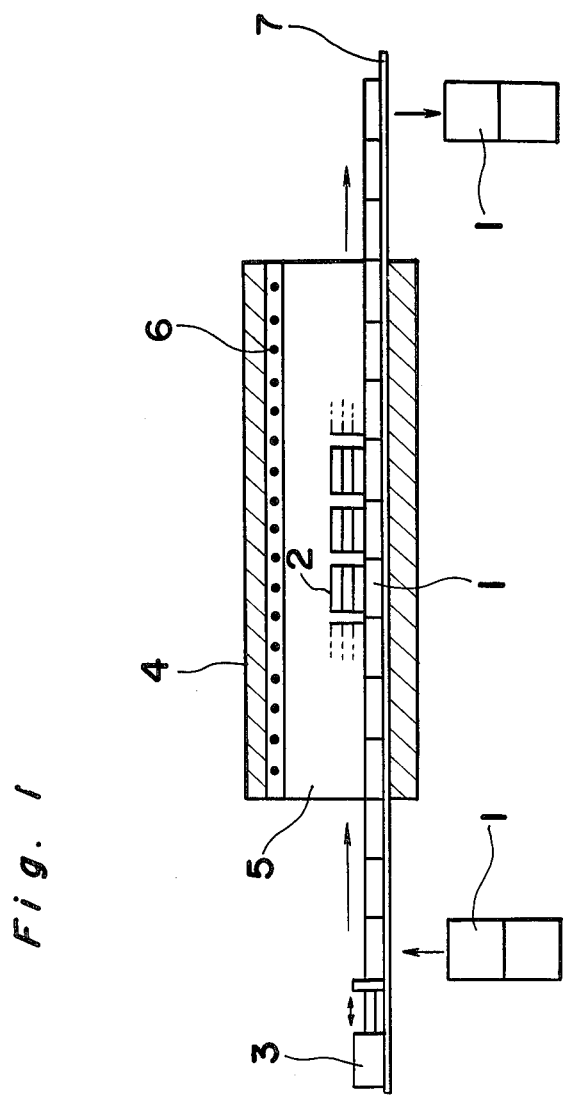
FIG. 1 is a vertical section of a conventional tunnel kiln.
Figure 2:
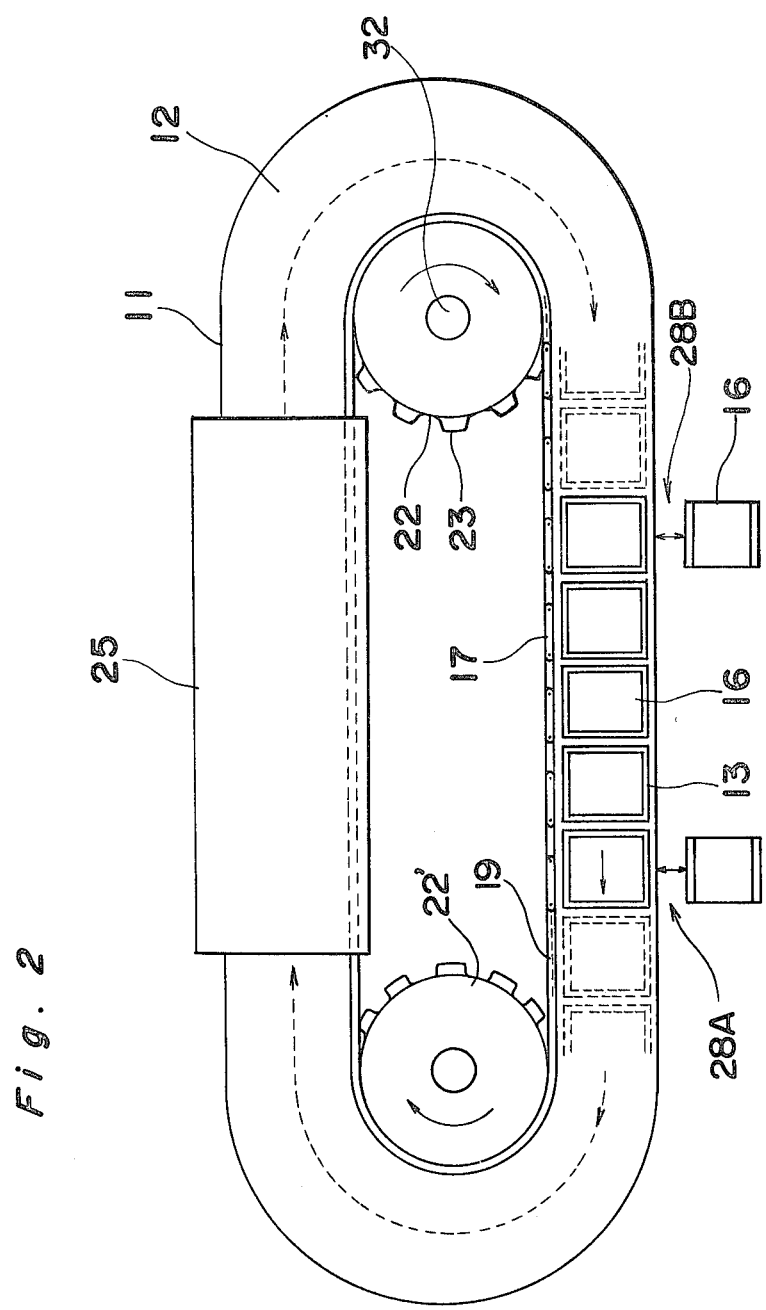
FIG. 2 is a diagrammatic plan view of a continuous firing equipment according to the present invention.
Figure 3:
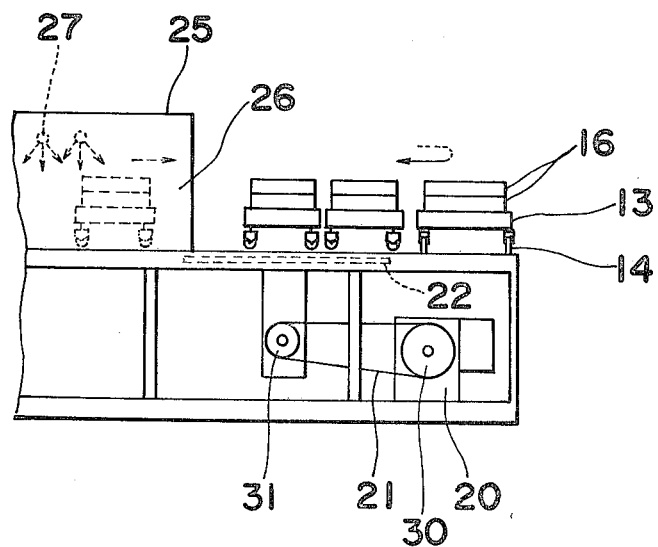
FIG. 3 is a diagrammatic partial side view of the continuous firing equipment shown in FIG. 2.
Figure 4:
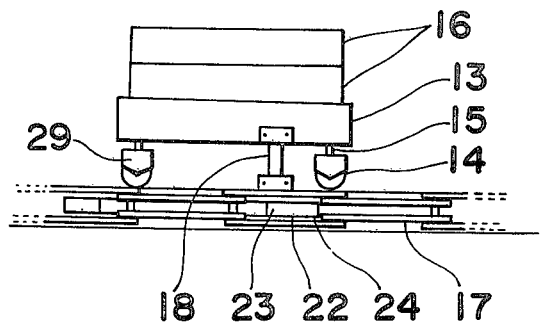
FIG. 4 is an enlarged diagrammatic partial side view of the equipment shown in FIG. 2, showing the coupling between the car and driving means.

Referring now to FIGS. 2 to 4, a continuous firing equipment according to the present invention comprises a looped track 11 having a horizontal flat surface 12, a number of cars 13 arranged on the track 11, and driving means, and a furnace body 25.

The looped track 11 comprises a pair of parallel linear portions and two curved portions that form a horizontal flat surface 12. One of the linear portions extends through the furnace body 25. The furnace body 25 is equipped with a number of resistance heating elements 27 (FIG. 3) arranged over the track along the length of the furnace. The heating elements may be arranged on both sides of the track along the length of the furnace. Since the furnace body 25 is generally constructed in a linear form, it is preferred to arrange the furnace body at the linear portion of the track 11 as shown in FIG. 2.

In order not to complicate FIG. 2 unnecessarily, only several cars 13 are depicted. In fact, cars are arranged all along the track 11. The number and the arrangement of the cars may be chosen at will. As best shown in FIGS. 3 and 4, each car 13 is made of a material with a small heat capacity and a high resistance to thermal shocks such as, for example, stainless steel, aluminium and like metals, and equipped with three or four wheels 14 that are independently supported by housings 29. Each housing 29 is pivotted to a shaft 15 so that the wheel may be turned in all directions by rotating the housing 29 around the axis passing through the axis of the shaft 15. The means for driving the cars comprises a chain 17 arranged along the inner circumference 19 (FIG. 2) of the track 11 and engaged with sprocket wheels 22, 22'. The chain 17 is driven by a driving sprocket wheel 22 which is, in turn, driven by a motor 20 via sprocket wheels 30, 31, a chain 21 and bevel gears (not shown). As can be seen from FIG. 4, the chain 17 is coupled to each of the cars 13 by means of an L-shaped coupling member 18. When the chain is driven by the driving sprocket wheel 22, the cars 13 are moved over the track 11. The car may have a flat surface having the sizes equal to that of the bottom surface of the saggar 16. The saggar 16 is made of a material having a resistance to firing heat, preferably, a ceramic wool material that has a small heat capacity and a high resistance to thermal shocks. The use of the ceramic wool material such as, for example, ceramic wool of alumina enables to achieve the high-speed firing.

In operation, the ware to be fired are placed on a saggar 16 which is then loaded on the car 13 at a loading station 28A. In FIG. 4, two saggars are loaded on each car 13, but the lower saggar is empty and is placed between the upper saggar and the flat surface of the car only for the purpose of the adjustment of heat applied to the ware. The car 13 on which one or more saggars 16 have been loaded is driven by the chain 17 and continuously moved from the station 28A to the furnace body 25, through which the car is moved to the station 28B. During passing through the chamber 26 of the furnace 25, the ware on the saggar 16 are heated to a firing temperature at a certain heating rate, for example, at 800° C./hour, fired at that temperature by the heat from the resistance heating elements 27, and then cooled at a certain cooling rate, for example, at 800° C./hour. The ware and the saggar coming out of the furnace are cooled rapidly by air, but there is no fear of breakage of the saggar. As each saggar 16 reaches the station 28B, it is unloaded from the car 13 and new one in which the ware to be fired have been placed is loaded thereon at the loading station 28A.

In the above embodiment, the means for driving the cars comprises the chain, but any other member such as a looped belt may be used instead of the chain 17. Also, any other driving mechanism may be employed for the combination of the motor, chain and sprocket wheels.

In the thus constructed equipment, the cars are continuously moved through the furnace body, thus making it possible to achieve the firing of the ware at a high-speed. For example, the firing of the ware can be achieved in about 4 to 5 hours. Since the cars are pulled by the chain and no mechanical shock or impact is applied, there is no need to use cars with a mechanical strength sufficiently large to resist the pressure applied by the pusher as in the conventional tunnel kiln. Also, it is possible to use light-weight saggars with a small heat capacity and a high resistance to thermal shocks, for example, a ceramic wool material. Thus, according to the present invention it is possible to cut the quantity of heat required for firing the ware, resulting in the reduction of the energy consumption.

In fact, when the cars are of stainless steel with sizes of 321 mm × 321 mm, the heat released from the car is 1713 Kcal/hour.m$^2$, which is approximately one-half of the heat released by the ceramic trays with a thickness of 165 mm in the conventional tunnel kiln, i.e., of 3256 Kcal/hour.m$^2$. The heat content of the trays in the tunnel kiln is 37867 Kcal/m$^2$, whereas the heat content of the car in the equipment of the present invention is 3389 Kcal/m$^2$ and reduces to approximately 1/11.

According to the present invention, the quantity of heat needed to heat the ware and cars to a firing temperature is reduced considerably as compared with that needed in the conventional kiln, thus making it possible to reduce the energy consumption. Since the heat absorbed by the cars is considerably small, it is possible to achieve rapid heating and cooling rate up to 800° C./hour, thus making it possible to achieve high-speed firing that is increased by approximately 4 times that of the conventional tunnel kiln of which the heating and cooling rate is 200° C./hour.

What we claim is:

1. The combination including continuous firing equipment and ceramic products fired thereby, said ceramic firing equipment comprising:
   a furnace body equipped with electrical heating equipment means;
   a horizontally looped track extending through said furnace body;
   a plurality of cars made of a metal material having a small heat capacity and a high resistance to thermal shocks arranged all along the track so as to travel on the track;
   a plurality of saggars made of a ceramic wool material and removably located on said cars, said saggars supporting said ceramic products; and
   means for driving said cars, said driving means comprising a looped driving member arranged along a circumference of said track and coupled to said cars.

2. The combination of claim 1, wherein said means for driving said cars comprises an endless chain, each of said cars being coupled to said endless chain.

3. The combination of claim 1, wherein said means for driving said cars comprises an endless belt, each of said cars being coupled to said endless belt.

4. The combination of claim 1 wherein the electrical heating elements are arranged over the track.

5. The combination of claim 1, wherein the looped track has a pair of linear portions and two curved portions, one of said linear portions extending through said furnace body.

6. The combination of claim 1, wherein said cars are made of stainless steel or aluminum and have a flat surface.

7. The combination of claim 6, wherein said flat surface of each car has the size substantially equal to that of a bottom surface of each saggar.

8. The combination of claim 1, wherein said saggars are held on to said cars only by the force of gravity.

* * * * *